United States Patent

[11] 3,542,423

| [72] | Inventor | Leland Berton Lawrence |
| | | Hilda, Missouri 65670 |
| [21] | Appl. No. | 712,179 |
| [22] | Filed | March 11, 1968 |
| [45] | Patented | Nov. 24, 1970 |

[54] SELF LEVELING TRACTOR SEAT MOUNT
4 Claims, 5 Drawing Figs.

[52] U.S. Cl. ................................................ 297/314, 248/371
[51] Int. Cl. .................................................. A47c 3/00
[50] Field of Search .......................................... 248/371, 398, 188.3, 183, 184, 185; 297/314

[56] References Cited
UNITED STATES PATENTS

| 420,430 | 2/1890 | Banks.......................... | 297/314 |
| 2,770,287 | 11/1956 | Christensen................. | 297/314 |

FOREIGN PATENTS

| 515,835 | 8/1955 | Canada ....................... | 297/314 |

*Primary Examiner*—Edward C. Allen
*Attorney*—Schmidt, Johnson, Hovey, Williams & Chase

ABSTRACT: A tractor seat mount comprised of two substantially L-shaped members overlying each other in a vertical plane and swingably connected at their outermost ends by ball joints. The seat mount is secured to the tractor by the lowermost L-shaped member and the seat is attached to the upper L-shaped member.

Patented Nov. 24, 1970
3,542,423
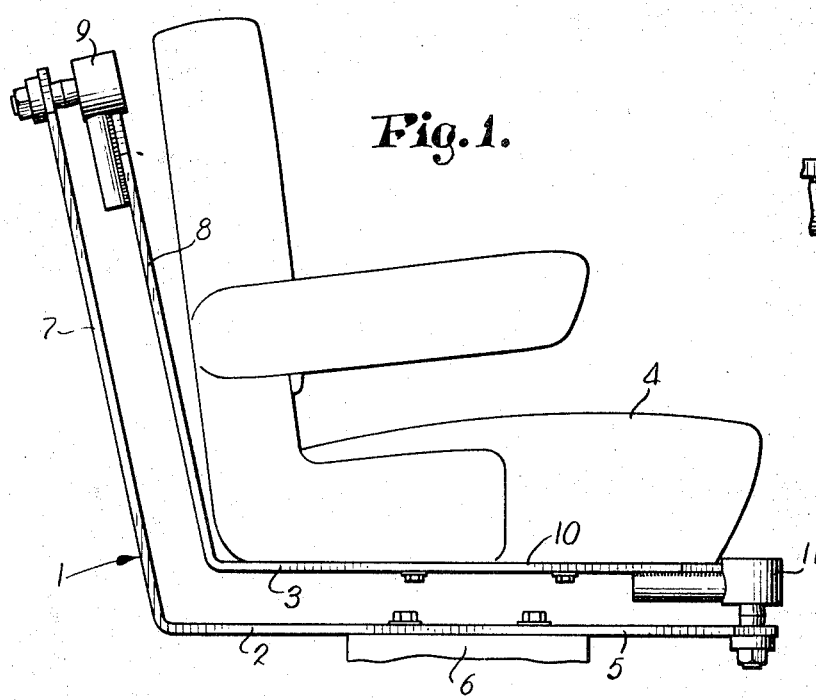
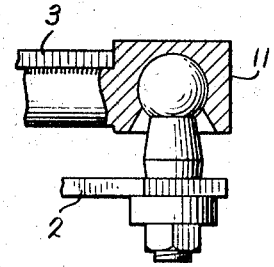
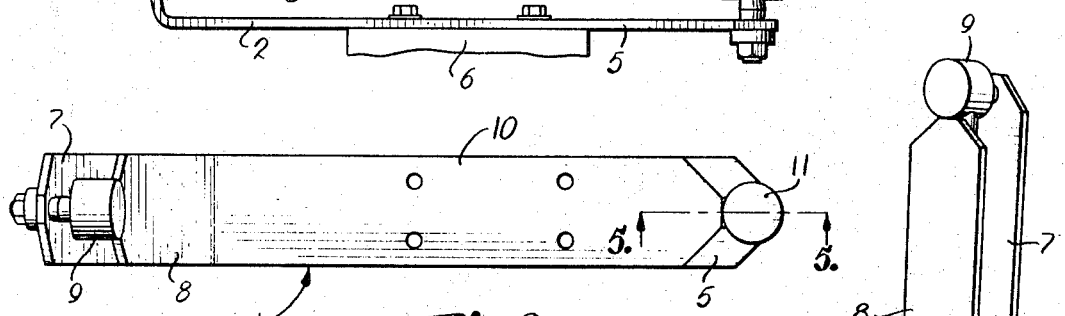
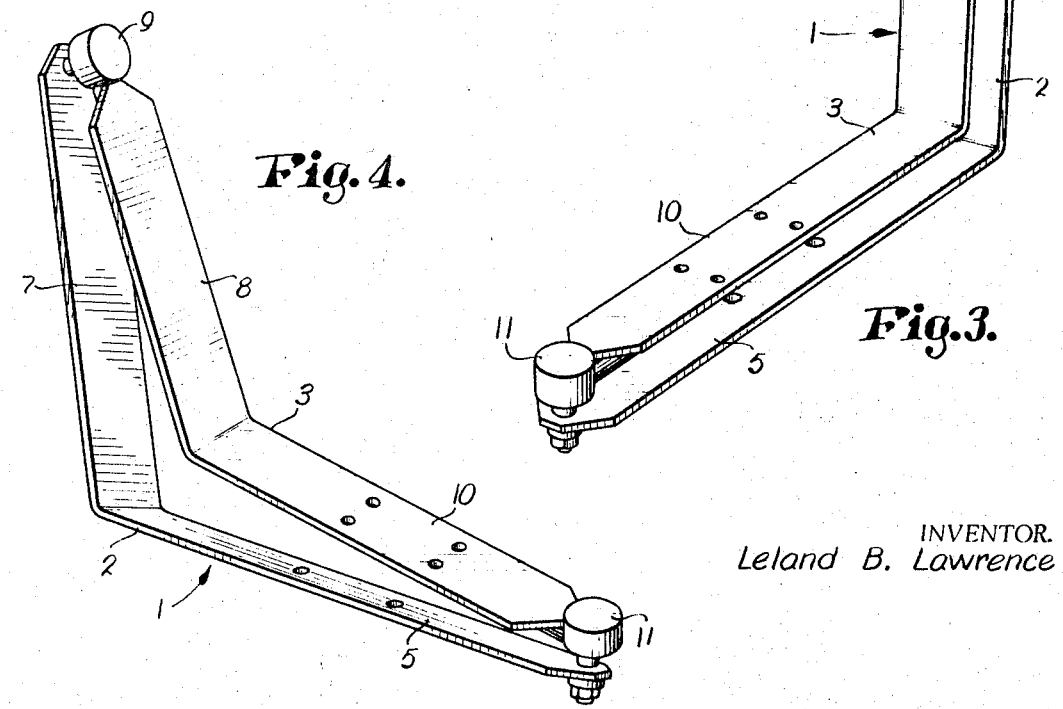
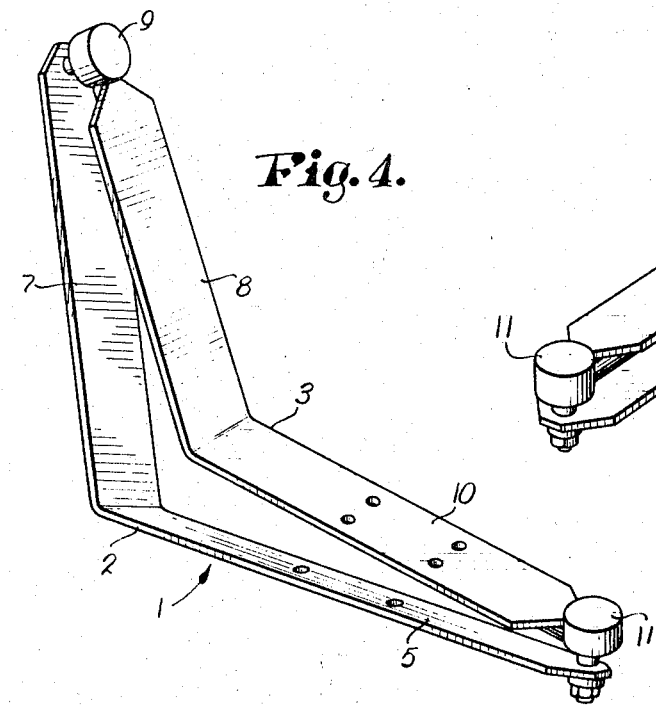
INVENTOR.
Leland B. Lawrence

SELF LEVELING TRACTOR SEAT MOUNT

The primary object of this invention is to provide a self-leveling seat mount that permits the operator to maintain a vertical position while operating on an inclined surface.

Another object of this invention is to provide a self-leveling seat mount that allows the operator to keep his hands free to control the tractor at all times.

Still another object of this invention is to provide a self-leveling seat mount that keeps the operator directly facing the controls of the tractor at all times.

FIG. 1 Side elevational view of self-leveling tractor seat mount showing tractor seat mounted thereon;

FIG. 2 Top plan of self-leveling tractor seat mount;

FIG. 3 Front perspective of self-leveling tractor seat mount shown in a normal position;

FIG. 4 Front perspective of self-leveling tractor seat mount in an articulated position; and FIG. 5 Vertical cross section taken along section line 5-5 of FIG. 2.

Self-leveling tractor seat mount broadly designated 1 as shown in FIG. 1 comprising of substantially L-shaped member 2 swingably interconnected with a second substantially L-shaped member 3 with tractor seat 4 mounted thereon.

L-shaped member 2 has a lower leg 5 mounted rigidly to tractor 6. Substantially vertical leg 7 of L-shaped member 2 is pivotally connected with vertical leg 8 of L-shaped member 3 through ball joint 9 located on their uppermost ends. Horizontal leg 10 of L-shaped member 3 is pivotally connected with horizontal leg 5 of L-shaped member 2 by ball joint 11 mounted on their outermost ends as shown in FIG. 2. L-shaped member 3 overlies L-shaped member 2 in vertical plane when tractor is in a level position.

FIG. 3 shows self-leveling tractor seat mount with tractor in level position.

FIG. 4 shows self-leveling tractor seat mount 1 with tractor and L-shaped member 2 in inclined position, and L-shaped member 3 which carries tractor seat 4 in a level position.

FIG. 5 shows a typical ball joint that swingably interconnects L-shaped members 2 and 3.

In operation the long vertical legs of the L-shaped members cause a low center of gravity for the horizontal leg that carries the seat. As the tractor moves along an inclined surface the upper L-shaped member swings about the ball joints connected to the ends of the lower L-shaped member.

I claim:

1. Self-leveling seating apparatus comprising:
structure supporting a seat and a back;
a generally L-shaped base member having an elongated, normally substantially horizontal leg provided with a forwardmost end and an elongated, generally upright leg provided with an uppermost end;
means for attaching said normally horizontal leg to a support subject to tilting and lateral displacement;
said structure including a generally L-shaped member having an elongated, normally substantially horizontal leg spaced above the first-mentioned normally horizontal leg and provided with a forwardmost end portion, and an elongated, generally upright leg spaced forwardly from the first-mentioned generally upright leg and provided with an uppermost end portion;
said uppermost end portion being disposed at an elevation at least as high as the middle of said back;
a ball joint interconnecting said forwardmost end portion and said forwardmost end;
a ball joint interconnecting said uppermost end portion and said uppermost end; and
said joints cooperating with each other to support said structure on said base member for lateral-swinging movement of the base member relative to the structure while the latter remains in a vertical plane under the force of gravity.

2. The invention of claim 1; said upright legs sloping rearwardly as said uppermost end and end portion are approached.

3. The invention of claim 1; said upright legs being straight and normally parallel with uniform spacing therebetween throughout their lengths.

4. The invention of claim 3; said horizontal legs being straight and normally parallel with uniform spacing therebetween throughout their lengths; and the normal distance between the horizontal legs being the same as the normal distance between the upright legs.